United States Patent Office 2,739,365
Patented Mar. 27, 1956

2,739,365

METHOD OF CASTING CONCRETE SLABS

Paul J. Choquette, White Plains, N. Y., assignor to Gilbane Building Company, a corporation of Rhode Island No Drawing. Application September 26, 1949,
Serial No. 117,951

1 Claim. (Cl. 25—155)

The present invention relates to the manufacture of precast concrete slabs for buildings and houses, and has particular reference to a novel separator emulsion.

Another object of the invention is to utilize a combination separator and sizing separator emulsion for concrete slabs which separates the slabs and sizes and improves their surface finish.

It has been found desirable to use a separator and surface treatment emulsion for concrete slabs which are manufactured in stacked relation, to produce a desired surface finish on the slabs while preventing the slabs from sticking together.

I have found that emulsified mineral oil or high boiling point solvents such as napthas operate as separating media when brushed or flowed over a cast concrete slab surface preliminary to casting of a superimposed concrete slab thereon. I have further found that when it is desired to increase the viscosity of an oil-in-water or a naptha-in-water emulsion in order to produce less flow or penetration for a particular casting operation that addition of methyl cellulose or of a carboxymethyl cellulose maintains the stability of the emulsion and yields improved results for the particular condition with no impairment of the subsequent painting operation. I have further found that when a resin or lacquer is utilized as the emulsifying agent for obtaining a water base emulsion, the resin or lacquer also acts as a sizing agent for the concrete surface and improves the finish as well as the coverage and the appearance of a subsequent painting operation.

Moreover, when the proportion of resin or lacquer is increased, the solution becomes suitable as a liquid carrier for pigment colors, which may in this manner be added to the slab surface to either reduce the number of coats of paint or, if desired, to eliminate the painting operation.

When the separator emulsion is thus utilized as a pigment carrier to deposit a pigment coating on the the concrete surface. it is preferred to apply the pigmented separator, allowing the coating to dry, and then to make an application of the sizing separator emulsion to ensure complete separation; the solvents utilized for the sizing separator emulsion are selected to be inert to the first coating of the pigmented separator.

I have found that either oil-in-water or water-in-oil emulsions may be utilized for the novel process, as the emulsified solvent separator will evaporate prior to the painting operation and have no detrimental effect on the finish or the painting operation. Choice of the type of emulsion to be used depends on the density of the concrete slab and on the type of surface finish or pigmenting desired, the oil-in-water type being particularly suitable when good body or viscosity is desired, whereby uniform application is facilitated on surfaces on which a thinner solution would have a tendency to run off.

An example of a thickened oil-in-water emulsion separator is as follows:

| | Percent by volume |
|---|---|
| Mineral sulfonate | 1¼ |
| Oleate soap | 1¼ |
| Mineral oil | 18 |
| Methyl cellulose or | 1½ |
| Carboxymethyl cellulose water | 78 |

An example of a solvent naptha-in-water emulsion suitable for use as a separator and sizer is as follows:

| | By volume |
|---|---|
| Unmodified urea formaldehyde resin. | 4% of a 50% solution. |
| Alkyd type resin (soya oxidizing type). | 6% of a 60% solution. |
| Solvesso-toluol | 20% |
| Water | 70% |

Suitable proportions for the unmodified resin are from 2 to 8% of a 50% solution; for the alkyd type, which is a drying oil modified alkyd resin derived from phthalic anhydride, glycerine and oil fatty acids (soya), from 3 to 6% of a 60% solution; and for solvesso-toluol, from 15 to 30%, the balance being water.

An example of a lacquer emulsion for use as a separator and pigment carrier is as follows:

| | Parts by volume |
|---|---|
| Twenty percent solution of copolymer of vinyl acetate and chloride dissolved in methylisobutylketone and a diluent | 80 |
| Ammonium recin oleate | ½ |
| Filler or pigment | 1–5 |
| Water | 15 |

The above specified proportions may be varied within limits ten percent lower or higher than specified, to obtain a quick drying solution for imparting a thin but full-bodied pigment coating to the concrete slab surface. It is preferred that the application of the pigment carrier separator be allowed to dry, and that an application of the sizing separator specified in the first example then be made, to ensure complete separation without damage to the pigment coating.

When it is desired to increase the rate of drying of the original pigmented lacquer emulsion application the proportion of water may be decreased or may be entirely omitted, in which case the clear pigmented lacquer is applied instead of the emulsion. It is preferred that this lacquer contain aproximately 18% solids content of a copolymer of vinyl chloride and acetate, with a small addition of a carboxylic group such as an acrylate to facilitate air drying, whereby a hard impervious colored finish is obtained.

Although I have described the invention as designed for the manufacture of concrete slabs in stacked relation, the surface treatment separator emulsion may be utilized in the manufacture of other cast or molded materials which are manufactured in stacks with contiguous surfaces capable of adhering when contacted.

I claim:

In the manufacture of pre-cast concrete slabs in stacked relation, the steps of casting a slab, applying a pigmented emulsion to the upper surface to coat and color said upper surface, drying the pigmented emulsion, applying a second emulsion to the colored upper surface to coat and size the upper surface, and casting another slab on the upper surface.

References Cited in the file of this patent

UNITED STATES PATENTS

| 1,168,492 | Freund | Jan. 18, 1916 |
| 2,041,041 | Batcheller | May 19, 1936 |
| 2,251,824 | Edwards | Aug. 5, 1941 |
| 2,336,484 | Klinkenstein et al. | Dec. 14, 1943 |
| 2,400,001 | Gruppelli | May 7, 1946 |